United States Patent [19]

Ohno

[11] Patent Number: 5,027,144
[45] Date of Patent: Jun. 25, 1991

[54] LENS CHANGER FOR CAMERAS

[75] Inventor: Kazunori Ohno, Omiya, Japan

[73] Assignee: Fuji Photo Optical Co., Ltd., Omiya, Japan

[21] Appl. No.: 544,906

[22] Filed: Jun. 28, 1990

[30] Foreign Application Priority Data

Jul. 28, 1989 [JP] Japan .................................. 1-193859

[51] Int. Cl.$^5$ .............................................. G03B 1/18
[52] U.S. Cl. ................................ 354/195.12; 352/142; 350/422
[58] Field of Search ..................... 354/195.12, 195.1; 352/142; 350/422, 430, 257

[56] References Cited

U.S. PATENT DOCUMENTS 4,038,673  7/1977  Schroder ..................... 354/195.12

Primary Examiner—L. T. Hix
Assistant Examiner—Cassandra C. Spyrou
Attorney, Agent, or Firm—Oblon, Spivak, McClelland, Maier & Neustadt

[57] ABSTRACT

Described herein is a lens changer for camera, which is provided with a unitary lens body integrally and contiguously formed with a main lens portion and at least one replacement lens portion of a different type in optical characteristics from the main lens portion, the lens body being movable across the optical axis of a camera to locate either the main lens portion or the replacement lens portion in a predetermined lens position forward of an image forming plane of the camera.

10 Claims, 5 Drawing Sheets

SPHERICAL ABERRATION
SINE CONDITION

FIELD CURVATURE

DISTORTION

SPHERICAL ABERRATION
SINE CONDITION

FIELD CURVATURE

DISTORTION

LENS CHANGER FOR CAMERAS

BACKGROUND OF THE INVENTION

1. Field of the Invention

This invention relates to a lens changer particularly suitable for use on disposable cameras.

2. Description of the Prior Art

Generally, for taking close up photographs, for example, it is necessary to replace a standard lens by a lens for close up photography or to shift a lens element or elements along the optical axis in case of a camera which uses the lens elements commonly for standard or general photography and macrophotography. In this connection, the taking range of the macrophotography which is provided by the lens shift has limits, and, especially in order to permit the macrophotography, it is necessary to use the so-called macro lens in addition to or in place of a standard lens.

On the other hand, there have been developed and put in use the so-called disposable cameras, which are designed for exposures of only one roll of film. In this connection, for the purpose of broadening the functions of the disposable camera, it is desirable to add the function of macrophotography by the macro lens to the ordinary or standard photography by the standard lens. However, the provision of the macro lens in addition to the standard lens unavoidably leads to an increased number of parts which will invite an increase in cost along with difficulties such as troublesome lens replacements and loss of replacement parts.

SUMMARY OF THE INVENTION

With the foregoing situations in view, the present invention has as its object the provision of a photographic lens changer which permits to use selectively a number of different types of lenses on a camera without the efforts of mounting or dismounting the lenses on or from the camera body.

It is another object of the present invention to provide a lens changer which is simple in construction and low in production cost and which is especially suitable for use on a disposable camera or the like.

In accordance with the present invention, the foregoing objects are achieved by a photographic lens changer for a camera, which is provided with a unitary lens body integrally and contiguously formed with a main lens portion and at least one replacement lens portion of a different type in optical characteristics from the main lens portion, the lens body being movable across the optical axis of a camera to locate either the main lens portion or the replacement lens portion in a predetermined lens position forward of an image forming plane of the camera.

The above and other objects, features and advantages of the invention will become apparent from the following description of the preferred embodiments and the appended claims, taken in conjunction with the accompanying drawings. Needless to say, the invention is not restricted to the forms or details of the particular embodiments shown.

BRIEF DESCRIPTION OF THE DRAWINGS

In the accompanying drawings:

FIGS. 1 to 3 show a first embodiment of the invention, of which

FIGS. 1 and 2 schematically show a lens construction in different operating modes.

DESCRIPTION OF PREFERRED EMBODIMENTS

Figure 1:
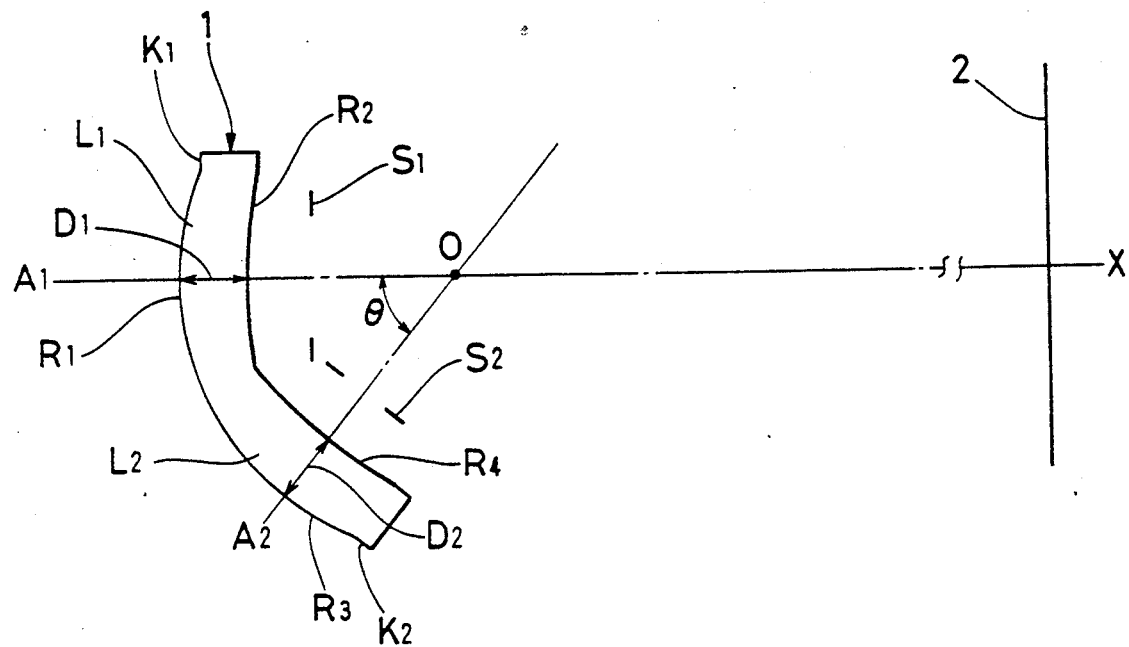
Figure 2:
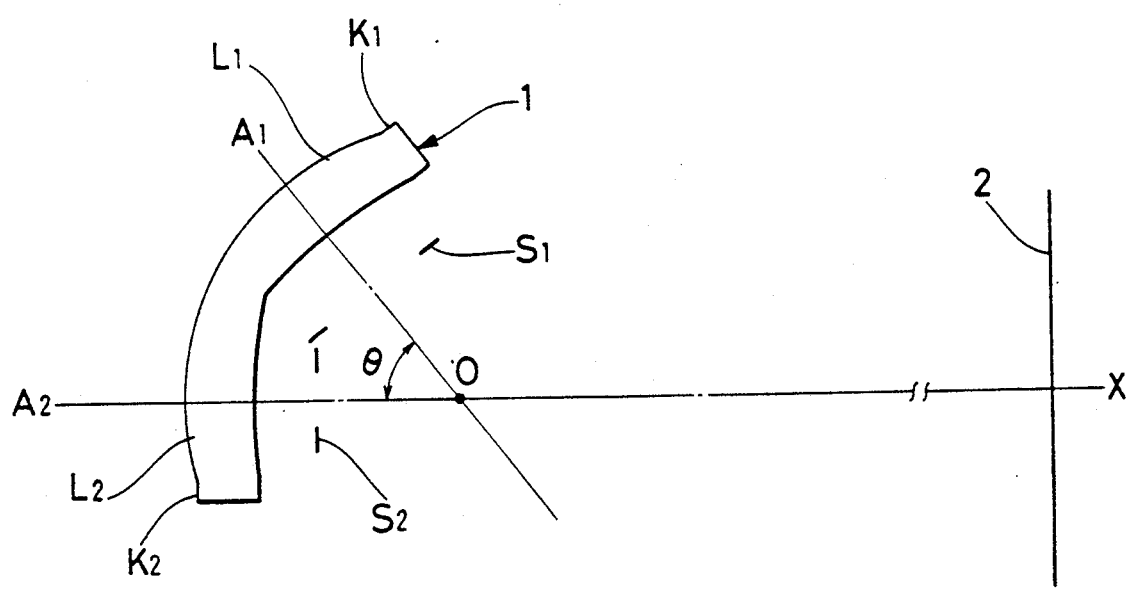

Hereafter, the invention is described more particularly by way of its preferred embodiments with reference to the drawings.

Referring first to FIGS. 1 to 3 and 7, there is shown a first embodiment of the invention, which is constituted by a unitary lens body 1 which is integrally formed with a main lens portion $L_1$ and a replacement lens portion $L_2$ of a different type in optical characteristics from the main lens portion $L_1$. The lens body 1 has holding faces $K_1$ and $K_2$ to be held at its two sides. In this instance, for the convenience of explanation, the lens body 1 is considered to have a main lens portion $L_1$ consisting of a standard lens designed for focussing an object in an ordinary photographic distance range of $\infty \sim 1$ m, and a replacement lens portion $L_2$ consisting of a macro lens designed for focussing an object in a macrophotographic distance range of $1$ m $\sim 0.4$ m.

The main and replacement lens portions $L_1$ and $L_2$ of the lens body 1 have a common radius of curvature $R_1$ and $R_3$ on the object side, forming a spherical surface having its center O on the axis X of light path to an imaging plane 2. On the other hand, on the imaging side, the main and replacement lens portions $L_1$ and $L_2$ have surfaces of different radii of curvature $R_2$ and $R_4$. Further, the main and replacement lens portions $L_1$ and $L_2$ are arranged such that their optical axes $A_1$ and $A_2$ intersect with each other at the point O.

The lens body 1 is reciprocally rotatable about the point O through an angle $\theta$ between the optical axes $A_1$ and $A_2$ of the main and replacement lens portions $L_1$ and $L_2$. In case of ordinary photography, the optical axis $A1$ of the main lens portion $L1$ is brought into a position coinciding with the axis X, and, in case of macrophotography, the lens body 1 is turned from that position through the angle $\theta$ to bring the optical axis $A2$ of the replacement lens portion $L_2$ into a position coinciding with the axis X. For switching the lens position, the lens body 1 can be rotated automatically by the use of an electric motor or the like, but a manual switching operation is advantageous in case of disposable cameras which are desired to be as simple as possible in construction and therefore to dispense with a lens drive mechanism.

Stops S1 and S2 are located on the imaging side of the main lens portion $L_1$ and replacement lens portion $L_2$ of the lens body 1, respectively. In this regard, the stop $S_2$ of the replacement lens portion $L_2$ which is provided for macrophotographic purposes may have a smaller diameter than the stop $S_1$ of the main lens portion $L_1$ to secure a greater depth of field than that of the main or standard lens portion $L_1$. In a case where the stops $S_1$ and $S_2$ are of different diameters for such a reason, they are arranged to be rotatable together with corresponding lens portion of the lens body 1. However, in a case where the stops of the main and replacement lens portions $L_1$ and $L_2$ of the lens body 1 are of the same diameter, a common stop for the two lens portions is fixedly provided on the optical axis X.

With the foregoing arrangements according to the invention, the lens body 1 is positioned to hold the optical axis $A_1$ of the main lens portion $L_1$ in alignment with the axis X as shown in FIG. 1 for standard photography, for example, for an object in the range of about $\infty \sim 1$ m. For macrophotography in the range of 1 m $\sim 0.4$ m, for example, the lens body 1 is turned about the point O to bring the optical axis $A_2$ of the replacement lens portion $L_2$ into alignment with the axis X as shown particularly in FIG. 2.

In this manner, the lens body 1 which contiguously has the main and replacement lens portions $L_1$ and $L_2$ permits to replace an ordinary standard photography by a macrophotographic photography easily by an extremely simple operation which requires only to turn the lens body 1. In addition to the simple operation, this arrangement contributes to reduce the number of parts and to simplify the construction of the camera as a whole to a considerable degree since there is no need for providing a lens changing mechanism on the part of the camera body, while precluding the problems of misplacing or losing replacement parts.

Besides, by turning the lens body 1 through $\theta$, either the main lens portion $L_1$ or the replacement lens portions $L_2$ on the lens body 1 can be correctly aligned with the axis X without deviations of the optical axes $A_1$ and $A_2$ thereof when switching the lens position from standard mode to macro mode or vice versa, precluding the problem of deviation of the optical axis in use.

Designating the surfaces on the object and imaging sides of the main lens portion $L_1$ on the lens body 1 as surfaces #1 and #2, respectively, the main lens portion $L_1$ is formed as follows.

| # | R | D | N | $\upsilon$ |
|---|---|---|---|---|
| 1 | 6.410 | 1.600 | 1.492 | 57.8 |
| 2 | 9.370 | | | | f' = 35.0,
Bf' = 32.12

(wherein R is the radius of curvature of each lens surface, D is the lens thickness at the center, N is the refractive index for line d, $\upsilon$ is the Abbe Number, f' is the focal length, and Bf' is the back focal length when the object distance is set at $\infty$.)

Designating the surfaces on the object and imaging sides of the replacement lens portion $L_2$ as #3 and #4, respectively, the replacement lens portion $L_2$ is formed as follows.

| # | R | D | N | $\upsilon$ |
|---|---|---|---|---|
| 3 | 6.410 | 1.600 | 1.492 | 57.8 |
| 4 | 9.663 | | | | f' = 33.30,
l' = 32.12

(wherein l' is the distance from the imaging side surface $R_4$ of the replacement lens portion $L_2$ to the imaging position when the object distance is set at 0.6 m.)

Figure 3A:
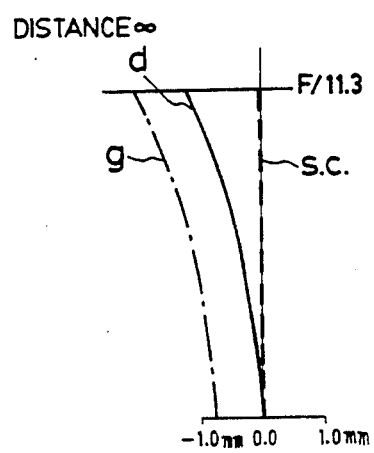
FIG. 3(a) is an aberration diagram obtained in the standard photography by the main lens portion in FIG. 1.
Figure 3B:
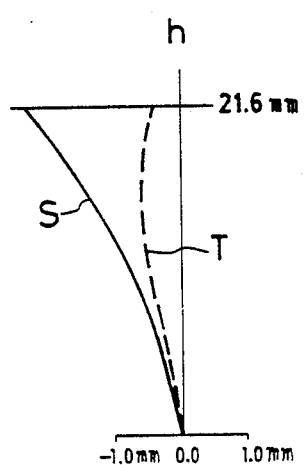
FIG. 3(b) is an aberration diagram obtained in the macrophotography by the replacement lens portion in FIG. 2.
Figure 3C:
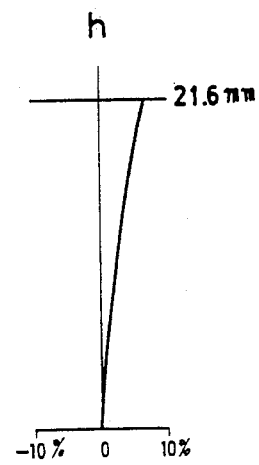
Figure 3D:
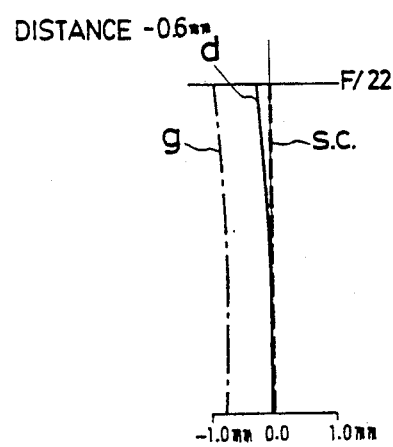
Figure 3E:
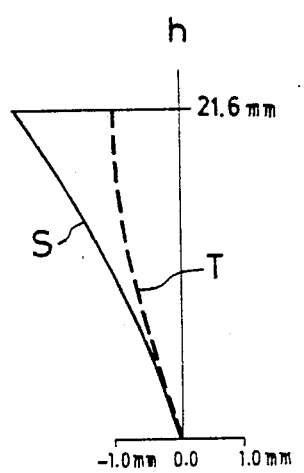
Figure 3F:
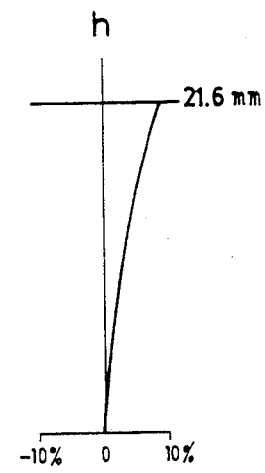

The aberration diagrams of FIG. 3(a) obtained in the standard photography by the main lens portion $L_1$ as well as the aberration diagrams of FIG. 3(b) obtained in the macrophotography by the replacement lens portion $L_2$ indicate the capability of producing pictures of practically satisfactory quality. Depending upon paraxial calculations, it is recommended to shift back or forth the film position slightly from the position as determined by the above-explained distance l' of the imaging plane from the lens, in consideration of residual aberration. The radius of curvature $R_1$ or $R_3$ may be an aspheric surface.

Figure 4:
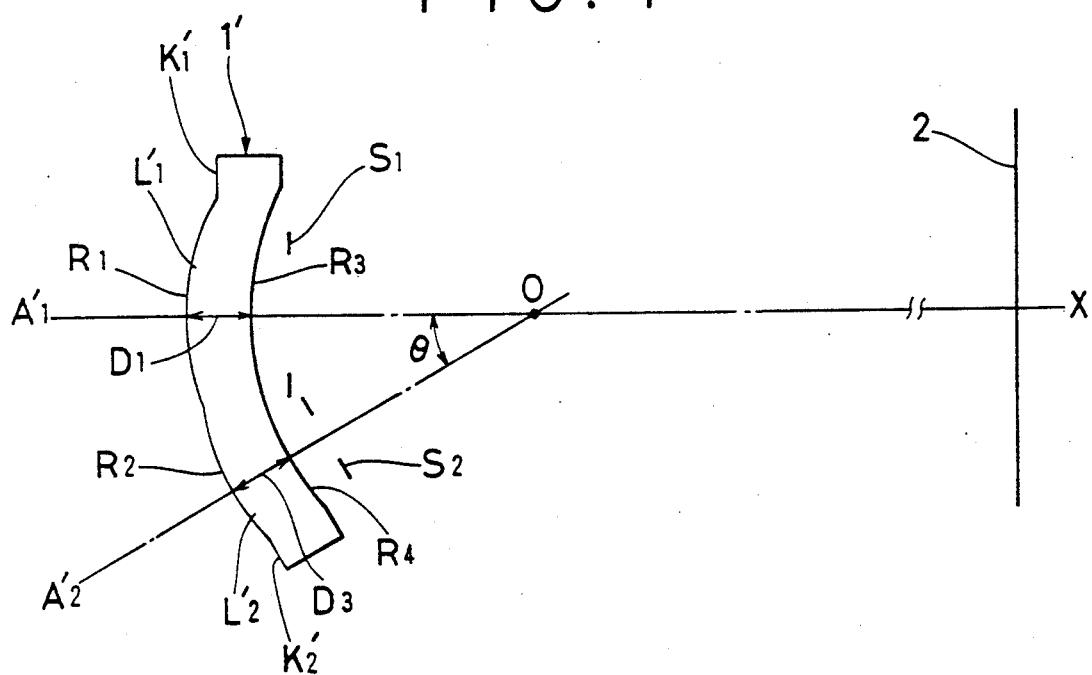
FIGS. 4 to 6 show another embodiment of the invention, of which FIGS. 4 and 5 schematically shows a lens construction in different operating modes.
Figure 5:
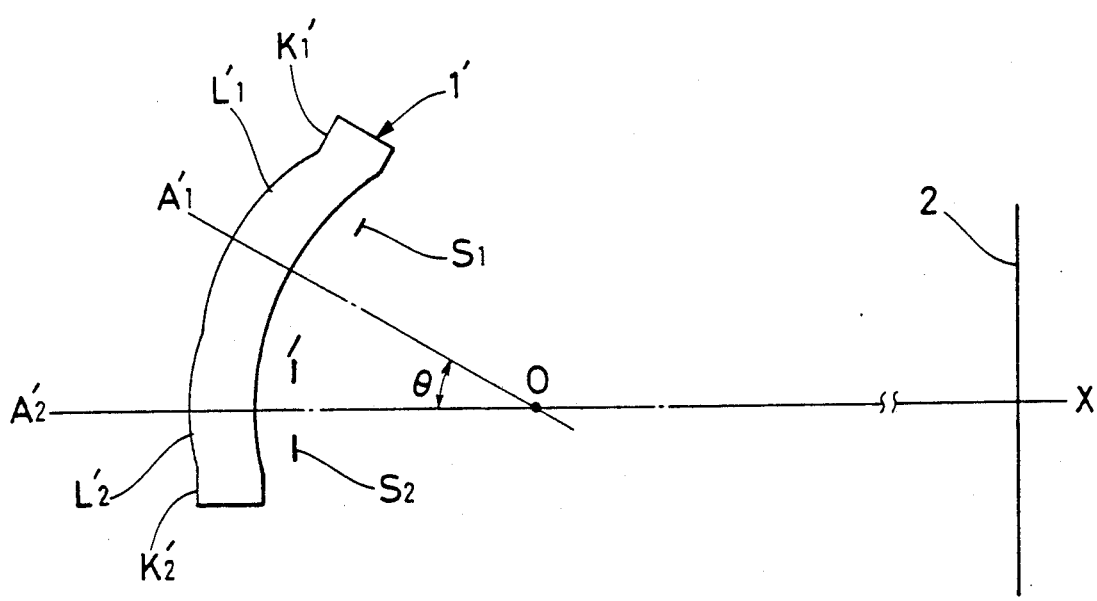

Referring now to FIGS. 4 to 6 and 8, there is schematically illustrated a second embodiment of the invention, in which main and replacement lens portions $L_1'$ and $L_2'$ of a lens body 1' are formed by a common spherical surface on the imaging side and by surfaces with different radii of curvature on the object side. In this case, similarly to the above-described first embodiment, the optical axis $A_1'$ of the main lens portion $L_1'$ is held in alignment with the axis X for standard photography as shown in FIG. 4, and the lens body 1' is turned from that position through an angle $\theta$ to bring the optical axis $A_2'$ of the replacement lens portion $L_2'$ into alignment with the axis X for macrophotography.

Designating the surfaces on the object and imaging sides of the main lens portion $L_1'$ of the lens body 1 as surfaces #1 and #2, respectively, the main lens portion $L_1'$ is formed as follows.

| # | R | D | N | $\upsilon$ |
|---|---|---|---|---|
| 1 | 5.205 | 1.600 | 1.492 | 57.8 |
| 2 | 6.623 | | | | f' = 36.0,
Bf' = 32.35

(wherein Bf' is the back focal length when the object distance is set at $\infty$.)

Designating the surfaces on the object and imaging sides of the replacement lens portion $L_2'$ as #3 and #4, respectively, the replacement lens portion $L_2'$ is formed as follows.

| # | R | D | N | $\upsilon$ |
|---|---|---|---|---|
| 3 | 5.094 | 1.600 | 1.492 | 57.8 |
| 4 | 6.623 | | | | f' = 33.34,
l' = 32.35

(wherein l' is the distance from the imaging side surface $R_4$ of the replacement lens portion $L_2'$ to the imaging position when the object distance is set at 0.6 m.)

Figure 6A:
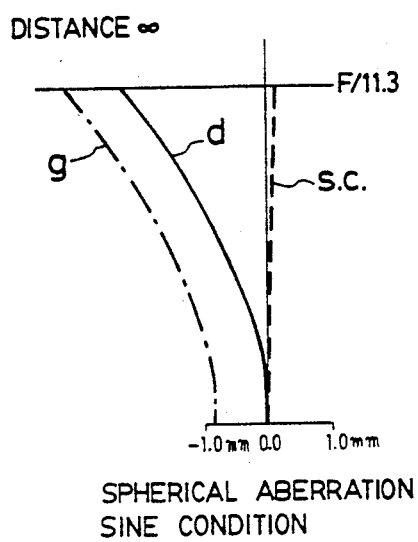
FIG. 6(a) is an aberration diagram obtained in the standard photography by the main lens portion in FIG. 4.
Figure 6B:
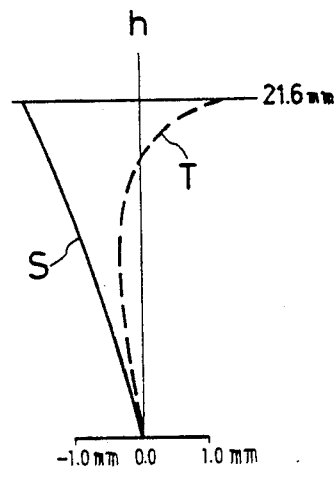
FIG. 6(b) is an aberration diagram obtained in the macrophotography by the replacement lens portion in FIG. 5.
Figure 6C:
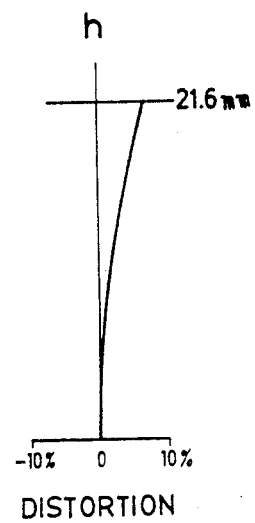
Figure 6D:
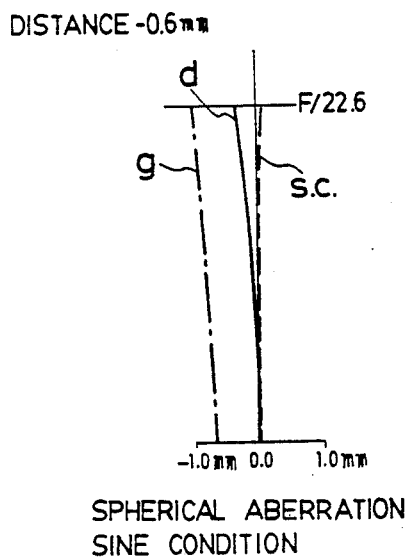
Figure 6E:
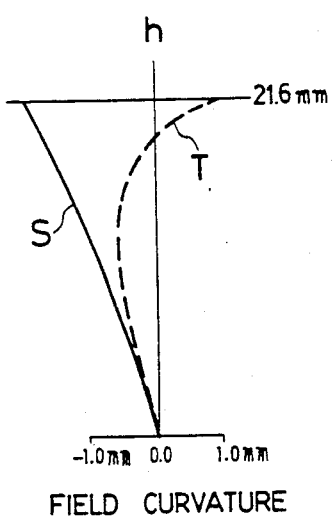
Figure 6F:
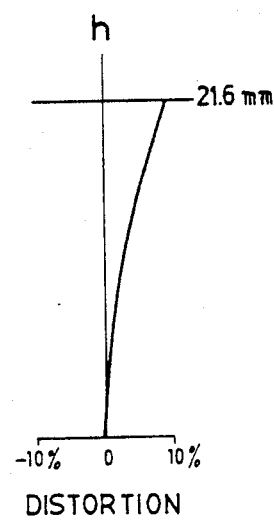
Figure 7:
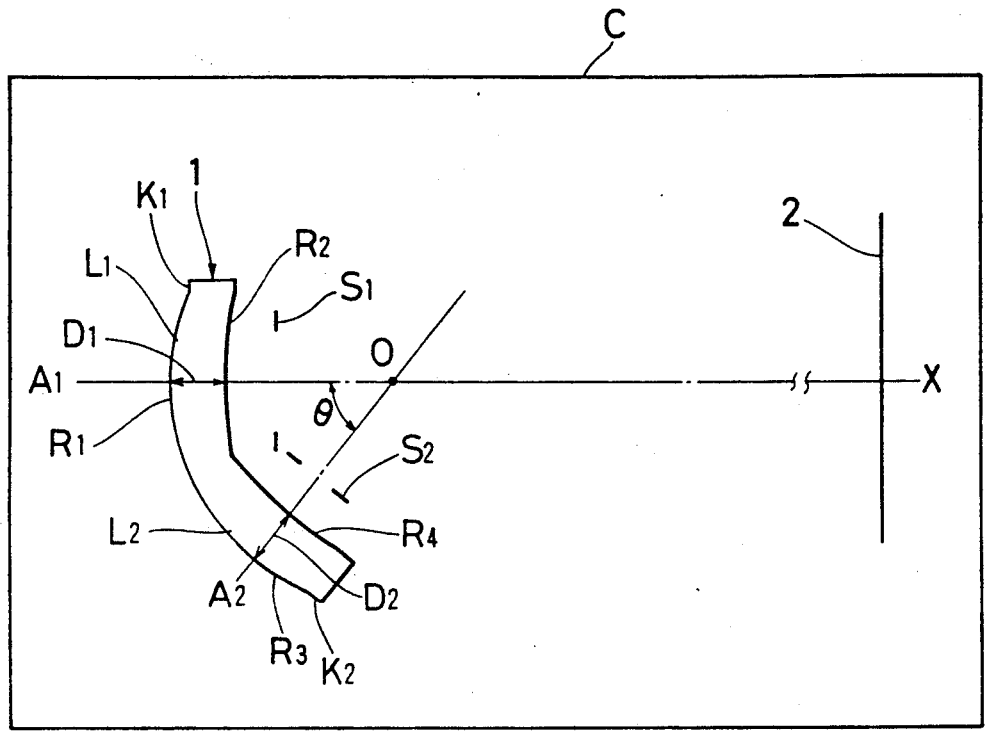
FIGS. 7 and 8 schematically illustrate the embodiments of FIGS. 1 and 4 mounted on a disposable camera, C.
Figure 8:
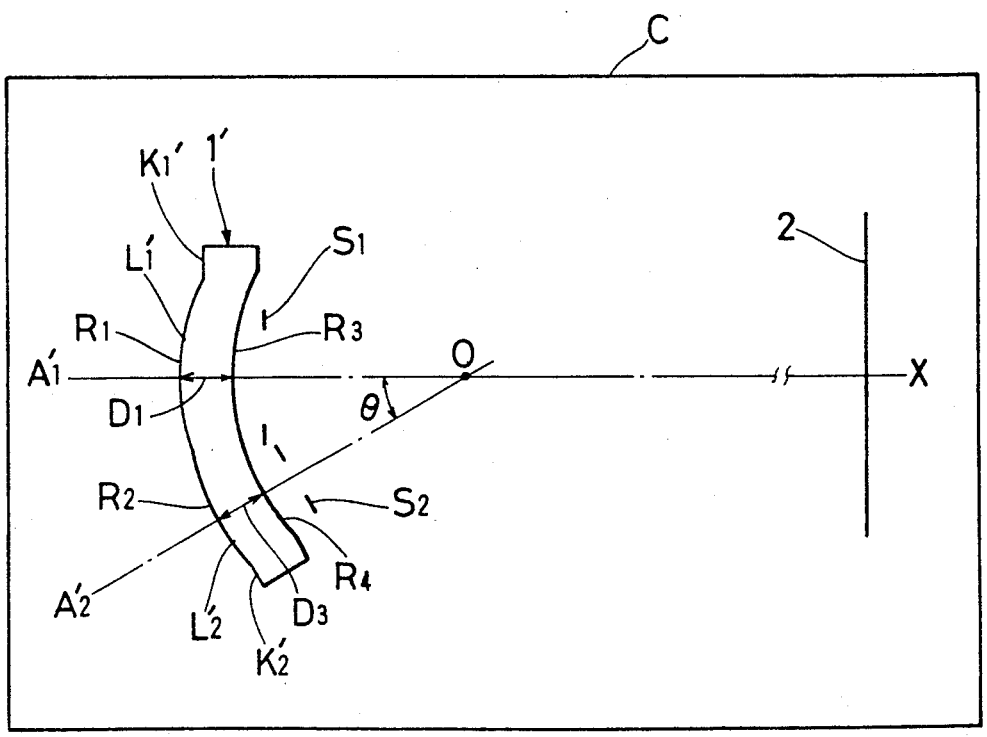

FIG. 6(a) shows the aberration diagrams of this embodiment in ordinary or standard photography, and FIG. 6(b) the aberration diagrams in macrophotography.

In FIGS. 3(a), 3(b), 6(a) and 6(b), F and h show F-number and a half size of the diagonal image height of the image formed at the image plane, respectively.

In the foregoing embodiments, the lens body 1 or 1' constituted by a main lens portion consisting of a standard lens capable of focussing an object in the distance range of ∞ ~1 m and a replacement lens portion consisting of a macrophotographic lens capable of focussing an object in the distance range of 1 m~0.4 m. However, the lens body is not restricted to these particular lenses shown, and may incorporate other types of lenses such as wide angle lens, telephoto lens and the like. Namely, there may be employed a lens body which is integrally formed with two or more lens portions of different types including or excluding the above-described ones. For switching the lens position, arrangements may be made to rotate the lens body about the point O on the axis X as described above, or alternatively arrangements may be made to slide the lens body in a direction perpendicular to the axis X or to switch the lens position by a complex motion which is composed of rotary and linear reciprocal movements. However, from the standpoint simplicity of the lens drive mechanism and lens positioning accuracy, it is preferred to adopt the mechanism of turning the lens body about the point O. The main and replacement lens portions of the lens body have been described and shown as having spherical surfaces of the same radius of curvature on either the object or imaging side because this arrangement contributes to simplify the construction of the mold to be used in the lens forming process, coupled with an advantage that the reference surfaces of the two lens portions can be easily brought into concordance with each other in an inspection stage subsequent to the lens forming process. Of course, the surfaces of the two lens portions may be shaped differently on each side of the lens body.

What is claimed is:

1. A lens changer for a camera, comprising:
  a unitary lens body integrally and contiguously formed with a main lens portion and at least one replacement lens portion of a different type in optical characteristics from said main lens portion, said lens body being movable across the optical axis of a camera to locate either said main lens portion or said replacement lens portion in a predetermined lens position forward of an image forming plane of said camera.

2. A lens changer as defined in claim 1, wherein said main lens portion is shaped to constitute a standard lens, wide angle lens, telephoto lens or macro lens.

3. A lens changer as defined in claim 1, wherein said replacement lens portion is shaped to constitute at least a standard lens, wide angle lens, telephoto lens or macro lens.

4. A lens changer as defined in claim 1, wherein said lens body is rotatable to set one of said main and replacement lens portions in said lens position while holding the other lens portion in a receded position.

5. A lens changer as defined in claim 1, wherein said main and replacement lens portions are shaped to have a common radius of curvature on the object side of said lens body.

6. A lens changer as defined in claim 1, wherein said main and replacement lens portions are shaped to have a common radius of curvature on the imaging side of said lens body.

7. A lens changer as defined in claim 1, wherein said body is formed by molding plastic into a unitary structure.

8. A lens changer as defined in claim 1, further comprising stops separately provided for said main and replacement lens portions.

9. A lens changer as defined in claim 1, further comprising a stop provided commonly for said main and replacement lens portions.

10. A lens changer as defined in claim 1, wherein said lens body is mounted on a disposable camera.

* * * * *